Oct. 13, 1942.  P. J. HARRINGTON  2,298,791
SOLVENT TREATING OF MINERAL OILS
Filed May 14, 1938
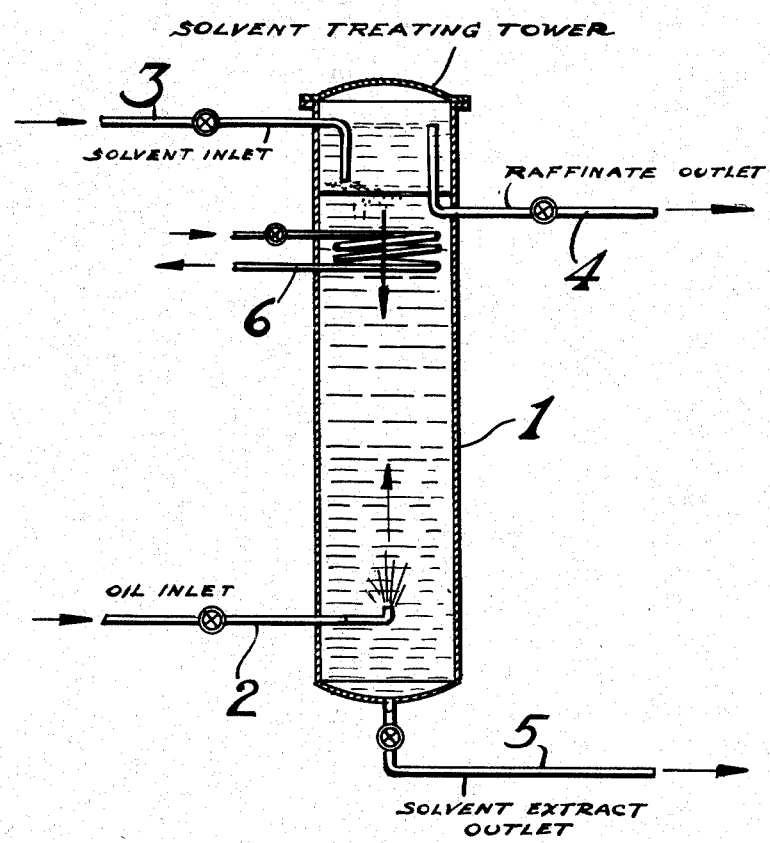
Paul J. Harrington Inventor
By P. L. Young Attorney Patented Oct. 13, 1942

2,298,791

UNITED STATES PATENT OFFICE 2,298,791

SOLVENT TREATING OF MINERAL OILS

Paul J. Harrington, Fanwood, N. J., assignor to Standard Oil Development Company, a corporation of Delaware Application May 14, 1938, Serial No. 207,874

2 Claims. (Cl. 196—13)

The present invention relates to an improved process for solvent treating mineral oils. It particularly relates to a process of separating mineral oil fractions into relatively more aromatic or naphthenic fractions and into relatively more paraffinic fractions by selective solvents which at ordinary temperatures and pressures are relatively immiscible with mineral oil fractions. The present invention especially relates to the extraction of petroleum oils at high temperatures and pressures with a solvent of the type of water or similar solvent and which may contain a relatively small amount of a modifying agent.

It is well known that mineral oils, as for example, petroleum oils, may be separated into relatively more paraffinic and into relatively more aromatic fractions by means of selective solvents such as phenol, furfural, nitrobenzene, beta beta dichlor diethyl ether, liquid sulfur dioxide and the like. Solvents of this class have the property of selectively dissolving the more aromatic constituents leaving the paraffinic fractions substantially undissolved. It is also known in the art to increase the selectivity of a particular solvent by adding an immiscible substance, as for example, water, to the solvent in various percentages. In these processes, however, the amount of immiscible substance added is a relatively small amount and in no case does the immiscible substance act as the actual solvent.

I have now found that mineral oils, as for example, petroleum oils, may be separated into relatively more aromatic and into relatively more paraffinic fractions by utilizing solvents which under normal temperature and pressure conditions exhibit no solvency for mineral oil fractions. I have discovered that solvents, as for example, water, may be used to solvent extract mineral oils at elevated temperatures and pressures. The solvent of my invention may be used in the pure state, although it is preferred to employ the solvent along with a relatively minor quantity of a modifying agent of the type of phenol, furfural, nitrobenzene, sulfur dioxide and the like.

The process of the present invention may be readily understood by reference to the attached drawing showing one modification of the invention. In this drawing 1 represents a solvent treating tower or other suitable receptacle or container which may be insulated as desired. Means are provided for maintaining any desirable temperature or pressure on the solvent treating tower. The oil is introduced into tower 1 by means of feed line 2 and flows upwardly through tower 1 intimately contacting the downflowing solvent which for the purposes of this illustration is taken to be water. The solvent is introduced into tower 1 by means of feed line 3 and is maintained as the continuous phase. The raffinate is withdrawn through take-off line 4 and the solvent extract is withdrawn through line 5. Tower 1 may be provided with any suitable distributing and contacting means, may be divided into sections and the flow of streams from the respective sections handled in any manner whatsoever. The temperature of tower 1 may be controlled by means of heating coils or by other means, as for example, by being heat jacketed.

The temperatures and pressures maintained on the solvent extracting system will vary widely, depending upon the mineral oil being treated, the solvent to oil ratio, as well as upon the particular solvent being used and the product desired. In general it is preferred to employ temperatures in the range from 200° to 700° F., preferably in the range from 300° to 400° F. The pressures employed are sufficient to maintain the constituents in the liquid phase.

The volume of solvent used per volume of oil being treated may also vary widely and will depend to a large extent upon the particular solvent being used, the oil being treated, as well as upon whether or not a solvent modifying agent is used. If the solvent is used in the pure state, it is preferred to use from six to eight volumes of water solvent per volume of oil being treated and to carry out the treatment at a temperature of around 575° F. A particularly desirable solvent for the purposes of the present invention is water containing from 5 to 20%, preferably 10 to 15%, of a modifying agent, as for example, phenol. When using a solvent of this type, the volume of solvent per volume of oil is preferably in the ratio of from three to six volumes of solvent per one volume of oil. Under these latter conditions, the temperature maintained on the solvent extracting system is in the range from 300° to 400° F.

In order to further illustrate the invention, the following examples are given and are not to be construed as limiting the invention in any manner whatsoever.

*Example 1*

Four volumes of water and one volume of benzol were mixed at ordinary temperatures and pressures. Under these conditions the water dissolved practically no benzol.

Four volumes of water and one volume of benzol were mixed at a temperature of about 575° F. under sufficient pressure to maintain the constituents in the liquid phase. Under these conditions the water layer contained about 15% of benzol.

*Example 2*

Four volumes of water were agitated at about 475° F. under sufficient pressure to maintain the constituents in the liquid phase with a petroleum oil having an average boiling point of 180° F. Under these conditions the water layer dissolved only about 1% of petroleum oil.

*Example 3*

A gasoline fraction having an average boiling point of about 400° F. and a specific gravity of about .8 was extracted at about 575° F. under sufficient pressure to maintain the constituents in the liquid phase with four volumes of water. The water layer dissolves about 5% of oil having a specific gravity of about 0.9.

*Example 4*

A petroleum oil was treated with a water solvent containing from about 10 to 20% phenol at a temperature of 350° to 450° F. at a pressure of about 230 pounds per square inch. The solvent dissolved appreciable amounts of aromatic compounds which were then separated by cooling of the solvent.

In general, the class of solvents with which the present invention is concerned are those solvents which are not miscible or do not dissolve petroleum or mineral oil fractions at normal temperatures and pressures. The preferred solvent is water, although other solvents, as for example, an oxygenated solvent selected from the class of alcohols, ketones, esters and aldehydes may be employed. These solvents are preferably used in combination with from 10 to 20% of a modifying agent.

The above invention is not to be limited by any theory or method of operation, but only by the following claims in which it is desired to claim all novelty insofar as the prior art permits.

I claim:

1. A solvent treating process comprising contacting mineral oil with a solvent comprising essentially water at a temperature of about 600° F. and at a pressure sufficient to maintain the constituents in the liquid phase under conditions to form a raffinate phase and a solvent extract phase, separating said phases and removing the solvent therefrom.

2. Process of solvent treating a petroleum oil comprising contacting said oil with water at a temperature of about 600° F. and at a pressure sufficient to maintain the constituents in the liquid phase, under conditions to form a solvent extract phase and a raffinate phase, separating said phases and removing the water therefrom.

PAUL J. HARRINGTON.